United States Patent
Ichikawa et al.

(10) Patent No.: US 7,706,924 B2
(45) Date of Patent: Apr. 27, 2010

(54) VIBRATION CONTROLLER FOR ACTIVE VIBRATION INSULATORS AND METHOD FOR CONTROLLING VIBRATIONS FOR THE SAME

(75) Inventors: Hiroyuki Ichikawa, Kani (JP); Atsushi Muramatsu, Komaki (JP); Takayoshi Yasuda, Komaki (JP)

(73) Assignee: Tokai Rubber Industries, Ltd., Komaki-shi (JP)

(*) Notice: Subject to any disclaimer, the term of this patent is extended or adjusted under 35 U.S.C. 154(b) by 1424 days.

(21) Appl. No.: 11/057,757

(22) Filed: Feb. 15, 2005

(65) Prior Publication Data
US 2005/0187692 A1 Aug. 25, 2005

(30) Foreign Application Priority Data
Feb. 20, 2004 (JP) ............................. 2004-044244

(51) Int. Cl.
*G01M 1/38* (2006.01)
(52) U.S. Cl. .................. 700/280; 701/111; 73/579
(58) Field of Classification Search .............. 700/275, 700/280; 701/1, 36, 68, 111; 702/191; 361/139, 361/143; 267/140.14
See application file for complete search history.

(56) References Cited

U.S. PATENT DOCUMENTS

| | | | | |
|---|---|---|---|---|
| 5,583,767 | A * | 12/1996 | Ehlig et al. ............... | 701/1 |
| 6,459,970 | B2 * | 10/2002 | Goto et al. ............... | 701/36 |
| 6,678,177 | B2 * | 1/2004 | Asano et al. .............. | 363/98 |
| 6,950,727 | B2 * | 9/2005 | Ichikawa .................. | 700/280 |
| 7,010,420 | B2 * | 3/2006 | Ichikawa et al. ........... | 701/111 |
| 7,409,268 | B2 * | 8/2008 | Ichikawa et al. ........... | 700/280 |
| 2005/0187673 | A1 * | 8/2005 | Mizushima et al. ......... | 701/1 |
| 2006/0287788 | A1 * | 12/2006 | Ichikawa et al. ........... | 701/36 |

FOREIGN PATENT DOCUMENTS

| | | |
|---|---|---|
| JP | 8-44377 | 2/1996 |
| JP | 11-259147 | 9/1999 |
| JP | 2001-1768 | 1/2001 |
| JP | 2001-3984 | 1/2001 |
| JP | 2001-140974 | 5/2001 |
| JP | 2002-122181 | 4/2002 |

* cited by examiner

*Primary Examiner*—Albert Decady
*Assistant Examiner*—Douglas S Lee
(74) *Attorney, Agent, or Firm*—Oblon, Spivak, McClelland, Maier & Neustadt, L.L.P.

(57) ABSTRACT

A vibration controller includes a map controller, an adaptive controller, a set-up frequency judge/switcher, and an actuator. The map controller includes a data map storage for storing data on control signals determined in advance for a vibration insulator, and a signal generator for selecting one of the data, depending on a frequency of a cyclically pulsating signal emitted from a vibration generating source of a vehicle, from the data map storage and generating a control signal. The adaptive controller generates the control signal with respect to the cyclically pulsating signal using an adaptive control method. The set-up frequency judge/switcher switches from the map controller to the adaptive controller or vice versa based on the frequency of the cyclically pulsating signal. The actuator actuates an actuator of the vibration insulator based on the control signal generated by the map controller or the adaptive controller, whereby inhibiting the vehicle from vibrating.

14 Claims, 4 Drawing Sheets

VIBRATION CONTROLLER FOR ACTIVE VIBRATION INSULATORS AND METHOD FOR CONTROLLING VIBRATIONS FOR THE SAME

BACKGROUND OF THE INVENTION

1. Field of the Invention

The present invention relates to a vibration controller and a vibration control method for active vibration insulators, vibration controller and method which can actively inhibit vehicles from vibrating.

2. Description of the Related Art

As disclosed in Japanese Unexamined Patent Publication (KOKAI) No. 8-44, 377 and Japanese Unexamined Patent Publication (KOKAI) No. 2001-140, 974, an adaptive control method, for example, an adaptive control method which uses an adaptive minimum mean squared filter, (hereinafter referred to as "Filtered-X LMS" filter) or a retarded harmonic synthesizer minimum mean squared filter (hereinafter referred to as "DXHS LMS" filter), has been applied to controlling the vibrations of an engine mount equipped with an actuator, an automotive active vibration insulator. In an adaptive control method, the filter coefficient of a "Filtered-X LMS" filter is updated sequentially to compensate the amplitude and phase of control signals for actuating an engine mount. Accordingly, outputs from a controlled system inhibit external forces resulting from the vibrations of a vehicle. Consequently, it is possible to carry out an adequate control depending on the types of vibration.

Moreover, as disclosed in Japanese Unexamined Patent Publication (KOKAI) No. 11-259, 147, a simplified method referred to as a map control method has been carried out. In the map control method, an optimum filter coefficient is determined for every arbitrary engine revolution in advance using an adaptive control method. The resulting optimum filter coefficient data are stored as a data map. The stored data map is retrieved as a ROM, for example, to carry out an active control adaptable to vehicle control devices. The map control method is good in terms of the control response, because it can simply select data from the data map to generate a control signal depending on the frequency of cyclically pulsating signals.

However, in a vibration control method for active vibration insulators using an adaptive control method, the control response has been retarded because the filter coefficient is updated sequentially. Accordingly, in a range of vibration whose frequency is as low as 50 Hz approximately, such as automobiles under idling, there arises a problem that the vibration control might impair the ride quality, because passengers might perceive the vibration intensely. Moreover, when an engine is installed to a vehicle sub frame, a vibration of the sub frame and a vibration of the engine might resonate in a range of vibration whose frequency is higher than 50 Hz, especially, in a range of vibration whose frequency is 80 Hz or more, such as automobiles under running. When such a resonant vibration is added to the inherent vibration of vehicle, the phase of control signal might possibly become unstable because the control response has been retarded in an adaptive control method. In this instance, there might arise a fear that the control signal oscillates to result in loss of control.

On the other hand, in the map control method, the number of data maps are limited. Accordingly, there arises a problem that it is difficult to cope with controls which require a large number of data maps depending on control conditions. For example, in a range of vibration whose frequency is high, such as automobiles under running, various driving operations affect vibrations which passengers perceive. Consequently, it is difficult for the map control method to fully cope with various vibrations. Thus, there is a problem that the map control method might impair the ride quality.

SUMMARY OF THE INVENTION

The present invention has been developed in order to solve the aforementioned problems. It is therefore an object of the present invention to provide a vibration controller for active vibration insulators, and a vibration control method for the same, vibration controller and vibration control method which can inhibit vehicles from vibrating over a wide range from vehicles under idling to vehicles under driving.

In order to achieve the aforementioned object, a vibration controller for active vibration insulators according to a first aspect of the present invention comprises:

a map controller including a data map storage for storing data on control signals determined in advance for a vibration insulator disposed on a vehicle, and a signal generator for selecting one of the data from the data map storage and generating a control signal, the one of the data depending on a frequency of a cyclically pulsating signal emitted from a vibration generating source of the vehicle;

an adaptive controller for generating the control signal with respect to the cyclically pulsating signal, the control signal based on an adaptive control method;

set-up frequency judging-and-switching means for switching from the map controller to the adaptive controller or vice versa based on the frequency of the cyclically pulsating signal, whereby letting one of the map controller and the adaptive controller generate the control signal; and means for actuating an actuator of the vibration insulator based on the control signal generated by one of the map controller and the adaptive controller, whereby inhibiting the vehicle from vibrating by means of vibrating forces exerted by the vibration insulator.

As described above, the vibration controller according to the first aspect of the present invention switches from the map controller to the adaptive controller or vice versa based on the frequency of the cyclically pulsating signal. Accordingly, the present vibration controller demonstrates the advantage of the map controller, the quick control response, as well the advantage resulting from the adaptive control method which can cope adequately with various driving conditions of vehicles. Consequently, the present vibration controller can inhibit vehicles from vibrating over a wide range from vehicles under idling to vehicles under running.

Moreover, the vibration controller according to the first aspect of the present invention can preferably be arranged so that the set-up frequency judging-and-switching means switches from the adaptive controller to the map controller when the frequency of the cyclically pulsating signal is a predetermined set-up frequency or less, whereby letting the map controller generate the control signal; and switches from the map controller to the adaptive controller when the frequency of the cyclically pulsating signal is higher than the predetermined set-up frequency, whereby letting the adaptive controller generate the control signal.

For example, the predetermined set-up frequency can preferably comprise a boundary frequency between a first frequency band emitted from the vehicle under idling and a second frequency band emitted from the vehicle under running. In this instance, the set-up frequency judging-and-switching means switches from the adaptive controller to the map controller to let the map controller generate the control signal when the vehicle is under idling. On the other hand, the set-up frequency judging-and-switching means switches from the map controller to the adaptive controller to let the adaptive controller generate the control signal when the vehicle is under running.

Moreover, the following can be another preferable example of the predetermined set-up frequency. Specifically, the vibrating generating source of the vehicle comprises an engine; and the set-up frequency is calculated from following equation (1). Note that a boundary frequency between a first frequency band emitted from the vehicle under idling and a second frequency band emitted from the vehicle under running can usually be equivalent to engine revolutions per 1 minute (NE) falling in a range of from 1,000 to 1,500 rpm.

$$Fs=(NE/60)/(Nc/k) \quad (1)$$

wherein Fs specifies the set-up frequency (in Hz);

NE specifies engine revolutions per 1 minute (in r/min) and falls in a range of from 1,000 to 1,5000 rpm;

Nc specifies crankshaft revolutions resulting from ignitions in all engine cylinders (in r); and k specifies the number of engine cylinders (in pieces).

The thus arranged vibration controller according to the first aspect of the present invention can judge whether the frequency of the cyclic pulsating signal is the predetermined set-up frequency or less or not; can switch from the adaptive controller to the map controller to let the map controller generate the control signal when the frequency of the cyclic pulsating signal is the predetermined set-up frequency or less; and can switch from the map controller to the adaptive controller to let the adaptive controller generate the control signal when the frequency of the cyclic pulsating signal is higher than the predetermined set-up frequency. Accordingly, the signal generator of the map controller can select one of the data, which comprise data on control signals determined in advance for the vibration insulator and are stored as a data map in the data map storage, from the data map storage to generate the control signal when the frequency of the cyclic pulsating signal is the predetermined set-up frequency or less. Consequently, the quick control response resulting from the map control method can quickly inhibit the vehicle from vibrating in a range of low-frequency vibration whose frequency is 50 Hz or less approximately, such as automobiles under idling. Thus, it is possible to solve the problem that passengers who perceive vibrations in the low-frequency range might feel that the ride quality has been impaired. On the other hand, the adaptive controller can generate the control signal with respect to the cyclic signal based on an adaptive control method when the frequency of the cyclic pulsating signal is higher than the predetermined set-up frequency. Therefore, it is possible to generate the control signal coping adequately with various vehicle running conditions based on an adaptive control method in a range of high-frequency vibration whose frequency is higher than the predetermined set-up frequency, such as vehicles under running.

Moreover, the vibration controller according to the first aspect of the present invention can preferably be arranged so that the set-up frequency judging-and-switching means switches from the map controller to the adaptive controller when the frequency of the cyclically pulsating signal is lower than a predetermined set-up frequency, whereby letting the adaptive controller generate the control signal; and switches from the adaptive controller to the map controller when the frequency of the cyclically pulsating signal is the predetermined set-up frequency or more, whereby letting the map controller generate the control signal. For example, in this instance, the vibration generating source can preferably be disposed on a sub frame of the vehicle; and the set-up frequency can preferably comprise a frequency being lower than a resonance frequency at which a vibration of the sub frame resonates to a vibration of the vibration generating source.

When an engine is disposed on a sub frame of the vehicle as set forth above, a vibration of the sub frame might resonate to a vibration of the vibration generating source to oscillate the cyclically pulsating signal or to resonate the frequency of the cyclically pulsating signal to the resonance frequency. For example, when the frequency of the cyclically pulsating signal falls in a frequency band including a resonance frequency at which a vibration of the sub frame resonates to a vibration of the engine, the vibration of the sub frame is likely to resonate to a vibration of the engine so as to oscillate the cyclically pulsating signal or to resonate the frequency of the cyclically pulsating signal to the resonance frequency. Specifically, the vibration of the sub frame resonates to the vibration of the engine at the above-described resonance frequency falling in a range of high-frequency vibration, for instance, about 100 Hz approximately, which is emitted from vehicles under running and is higher than a range of vibration whose frequency is 50 Hz approximately, for example. When the frequency of the cyclically pulsating signal falls in a frequency range over a set-up frequency, for instance, 80 Hz, which is lower than the resonance frequency, the set-up frequency judging-and-switching means switches the adaptive controller to the map controller. Then, the signal generator of the map controller selects one of the data from the data map storage depending on the frequency of the cyclically pulsating signal, and generates the control signal based on the selected data. Thus, switching the constituent element responsible for the vibration control from the adaptive controller to the map controller enables the vibration controller according to the first aspect of the present invention to quickly respond to resonant vibrations to damp them. As a result, when the frequency of the cyclically pulsating signal falls in a frequency band including a resonance frequency, the present vibration controller can inhibit the control signal's phase and/or frequency instability resulting from the vibration of the sub frame resonating to the vibration of the engine, and can accordingly prohibit the occurrence of out-of-control state due to the oscillation of the control signal.

Moreover, the vibration controller according to the first aspect of the present invention can preferably be arranged so that the map controller comprises:

a first map controller including a first data map storage for storing first data on first control signals determined in advance for the vibration insulator, and a first signal generator for selecting one of the first data from the first data map storage and generating a control signal; and a second map controller including a second data map storage for storing second data on second control signals determined in advance for the vibration insulator, and a second signal generator for selecting one of the second data from the second data map storage and generating a control signal; and the set-up frequency judging-and-switching means switches from the adaptive controller to the first map controller when the frequency of the cyclically pulsating signal is a first set-up frequency or less, whereby letting the first map controller generate the control signal; switches from the map controller to the adaptive controller when the frequency of the cyclically pulsating signal is higher than the first set-up frequency and is lower than a second set-up frequency, whereby letting the adaptive controller generate the control signal; and switches from the adaptive controller to the second map controller when the frequency of the cyclically pulsating signal is the second set-up frequency or more, whereby letting the second map controller generate the control signal.

In this instance, the first predetermined set-up frequency can preferably comprise a boundary frequency between a first frequency band emitted from the vehicle under idling and a second frequency band emitted from the vehicle under running, for example.

Moreover, the following can be another preferable example of the predetermined first set-up frequency. Specifically, the vibrating generating source of the vehicle comprises an engine; and the first set-up frequency is calculated from following equation (2).

$$Fs=(NE/60)/(Nc/k) \qquad (2)$$

wherein Fs specifies the set-up frequency (in Hz);

NE specifies engine revolutions per 1 minute (in r/min) and falls in a range of from 1,000 to 1,5000 rpm;

Nc specifies crankshaft revolutions resulting from ignitions in all engine cylinders (in r); and k specifies the number of engine cylinders (in pieces).

In addition, the vibration generating source can preferably be disposed on a sub frame of the vehicle; and the second set-up frequency can preferably comprise a frequency being lower than a resonance frequency, at which a vibration of the sub frame resonates to a vibration of the vibration generating source, and being higher than the first set-up frequency, for instance.

The thus arranged vibration controller according to the first aspect of the present invention carries out the vibration control by means of a map control when the frequency of the cyclically pulsating signal is the first set-up frequency or less and when the frequency of the cyclically pulsating signal is the second set-up frequency or more; and carries out the vibration control based on an adaptive control method when the frequency of the cyclically pulsating signal is higher than the first set-up frequency and is lower than the second set-up frequency. Accordingly, the thus arranged present vibration controller can effect the above-described advantages similarly. That is, the thus arranged present vibration controller carries out a map control when the frequency of the cyclically pulsating signal is a predetermined first set-up frequency or less, and carries out an adaptive control when the frequency of the cyclically pulsating signal is higher than the predetermined first set-up frequency or less, thereby producing the advantages, the advantages effected in the first low-frequency vibration range as well as in the first high-frequency vibration range. Moreover, the thus arranged present vibration controller carries out an adaptive control when the frequency of the cyclically pulsating signal is lower than a second predetermined set-up frequency, and carries out a map control when the frequency of the cyclically pulsating signal is the predetermined second set-up frequency or more, thereby producing the advantages, the advantages effected in the second low-frequency vibration range as well as in the second high-frequency vibration range.

Moreover, in order to achieve the aforementioned object, a method for controlling vibrations of active vibration insulators according to a second aspect of the present invention comprises the steps of:

generating a map control signal using a data map, which stores data on control signals determined in advance for a vibration insulator disposed on a vehicle, the data depending on a frequency of a cyclically pulsating signal emitted from a vibration generating source of the vehicle, by selecting one of the data from the data map, the one of the data depending on the frequency of the cyclically pulsating signal, thereby generating one of the control signals;

generating an adaptive control signal depending on the frequency of the cyclically pulsating signal, thereby generating one of the control signals with respect to the cyclically pulsating signal, the one of the control signals based on an adaptive control method; and actuating an actuator of the vibration insulator based on the control signal generated by one of the map-control-signal generating step and the adaptive-control-signal generating step depending on the frequency of the cyclically pulsating signal, thereby inhibiting the vehicle from vibrating by means of vibrating forces exerted by the vibration insulator.

The vibration control method according to the second aspect of the present invention arranged as described above switches the generation of the control signal from a map control to an adaptive control or vice versa depending on the frequency of the cyclically pulsating signal. Accordingly, the present vibration control method demonstrates the advantage of the map control, the quick control response, as well the advantage resulting from the adaptive control method which can cope adequately with various driving conditions of vehicles. Consequently, the present vibration control method can inhibit vehicles from vibrating over a wide range from vehicles under idling to vehicles under running.

Further, the vibration control method according to the second aspect of the present invention can preferably be arranged so that the map-control-signal generating step generates the control signal when the frequency of the cyclically pulsating signal is a predetermined set-up frequency or less; and the adaptive-control-signal generating step generates the control signal when the frequency of the cyclically pulsating signal is higher than the predetermined set-up frequency.

Furthermore, the vibration control method according to the second aspect of the present invention can preferably be arranged so that the map-control-signal generating step generates the control signal when the frequency of the cyclically pulsating signal is a predetermined set-up frequency or more; and the adaptive-control-signal generating step generates the control signal when the frequency of the cyclically pulsating is lower than the predetermined set-up frequency.

Moreover, the vibration control method according to the second aspect of the present invention can preferably be arranged so that the data map comprises:

a first data map; and a second data map;

the map-control-signal generating step comprises the steps of:

generating a first data map control signal using the first data map by selecting one of the data from the first data map, the one of the data depending on the frequency of the cyclically pulsating signal, when the frequency of the cyclically pulsating signal is a first set-up frequency or less, thereby generating the control signal; and generating a second data map control signal using the second data map by selecting one of the data from the second data map, the one of the data depending on the frequency of the cyclically pulsating signal, when the frequency of the cyclically pulsating signal is higher than the first set-up frequency and is a second set-up frequency or more, thereby generating the control signal; and the adaptive-control-signal generating step generates the control signal when the frequency of the cyclic pulsating is higher than the first set-up frequency and is lower than the second set-up frequency.

In the thus arranged vibration control method according to the second aspect of the present invention, it is possible to use a data map, which stores data on control signals determined in advance for the vibration insulator, in order to quickly generate the control signal by selecting one of the data, depending on the frequency of the cyclically pulsating signal, from the data map. Note that a map control method can quickly inhibit vehicles from vibrating in a range of low-frequency vibration whose frequency is 50 Hz or less approximately, such as vehicles under idling, because it exhibits a fast control response. Accordingly, it is possible to solve the problem that passengers who perceive vibrations in the low-frequency vibration range might feel that the ride quality has been impaired. On the other hand, it is possible to generate the control signal coping adequately with various vehicle driving conditions based on an adaptive control method in a range of the high-frequency vibration range whose frequency is higher than the predetermined set-up frequency, such as vehicles under running. Moreover, an adaptive control method updates the filter coefficient of a "Filtered-X LMS," for example, sequentially to compensate the amplitude and phase of control signals for actuating an engine mount in order to inhibit external forces, which result from the vibration of a vehicle, by outputs from a transmission function of a controlled system. Consequently, in the present vibration control method, it is possible to carry out an adequate control depending on the types of vibration.

Moreover, when an engine, the vibration generating source, is disposed on a sub frame of the vehicle, a vibration of the sub frame might resonate to a vibration of the vibration generating source to oscillate cyclically pulsating signal or to resonate the frequency of the cyclically pulsating signal to the resonance frequency. For example, when the frequency of the cyclically pulsating signal falls in a frequency band including a resonance frequency at which a vibration of the sub frame resonates to a vibration of the engine, the vibration of the sub frame is likely to resonate to a vibration of the engine so as to oscillate the cyclically pulsating signal or to resonate the frequency of the cyclically pulsating signal to the resonance frequency. Specifically, the vibration of the sub frame resonates to the vibration of the engine at the above-described resonance frequency falling in a range of high-frequency vibration, for instance, about 100 Hz, which is emitted from vehicles under running and is higher than a range of vibration whose frequency is 50 Hz approximately, for example. When the frequency of the cyclically pulsating signal falls in a frequency range over a set-up frequency, for instance, 80 Hz, which is lower than the resonance frequency, switching the vibration control from an adaptive control to a map control enables the vibration control method according to the second aspect of the present invention to quickly respond to resonant vibrations to damp them. As a result, when the frequency of the cyclically pulsating signal falls in a frequency band including a resonance frequency, the present vibration control method can inhibit the control signal's phase and/or frequency instability resulting from the vibration of the sub frame resonating to the vibration of the engine, and can accordingly prohibit the occurrence of out-of-control state due to the oscillation of the control signal.

The present invention distinguishes the frequency of the cyclically pulsating signal emitted from the vibration generating source in accordance with a predetermined set-up frequency, for instance, a boundary frequency between a first frequency band emitted from the vehicle under idling and a second frequency band emitted from the vehicle under running. When the frequency of the cyclically pulsating signal is the set-up frequency or less, the present invention carries out the vibration control by means of a map control. On the other hand, when the frequency of the cyclically pulsating signal is higher than the set-up frequency, the present invention carries out the vibration control by means of an adaptive control.

Thus, the present invention combines the advantage of the map control, the fast response, and the advantage of the adaptive control, allowing an adequate control coping adequately with complicated driving conditions of vehicles under running. Therefore, it is possible to carry out an adequate vibration control over wide driving conditions of vehicles.

Moreover, when the vibration generating source is disposed on a sub frame of the vehicle, the present invention switches from the adaptive control method to the map control method if the frequency of the cyclically pulsating signal is a set-up frequency or more, set-up frequency which is lower than a resonance frequency. Accordingly, the present invention can quickly respond to resonant vibrations to damp them. Consequently, the present invention can securely inhibit the occurrence of out-of-control state resulting from the oscillation of the control signal.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present invention will be hereinafter described in detail with reference to specific examples of the present invention using accompanied drawings.

EXAMPLE NO. 1

Figure 1:
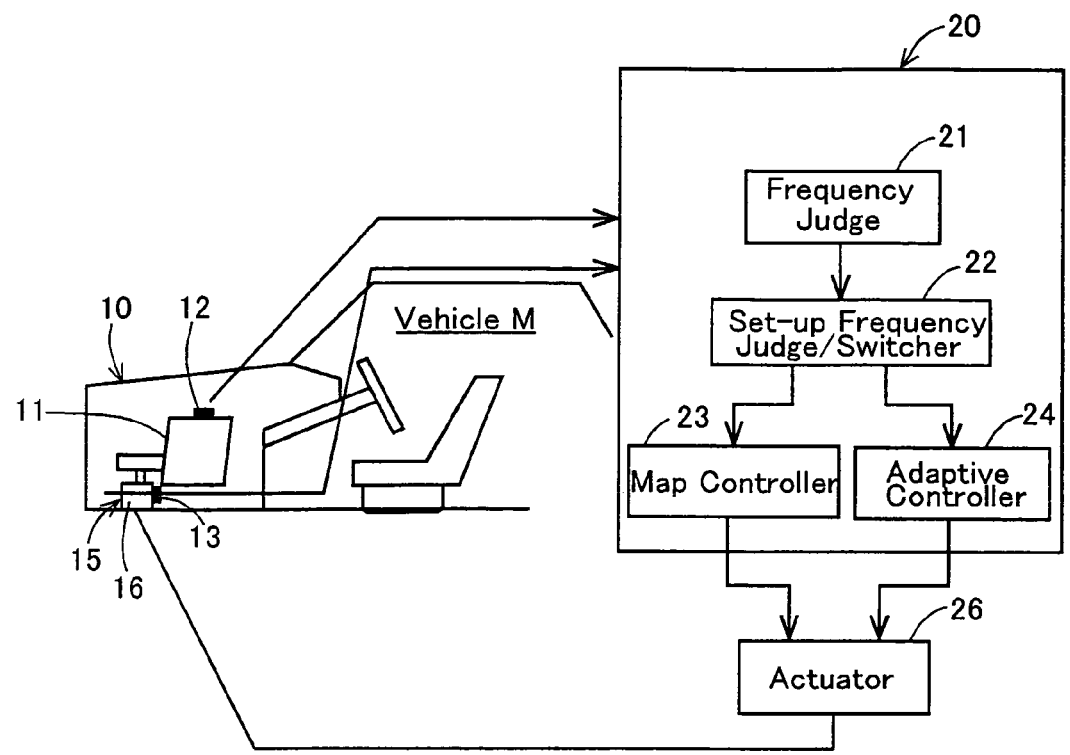
FIG. 1 is a schematic diagram for roughly illustrating an arrangement of a vibration controller according to Example No. 1 of the present invention for a gasoline-engine-driven vehicle M.
Figure 2:
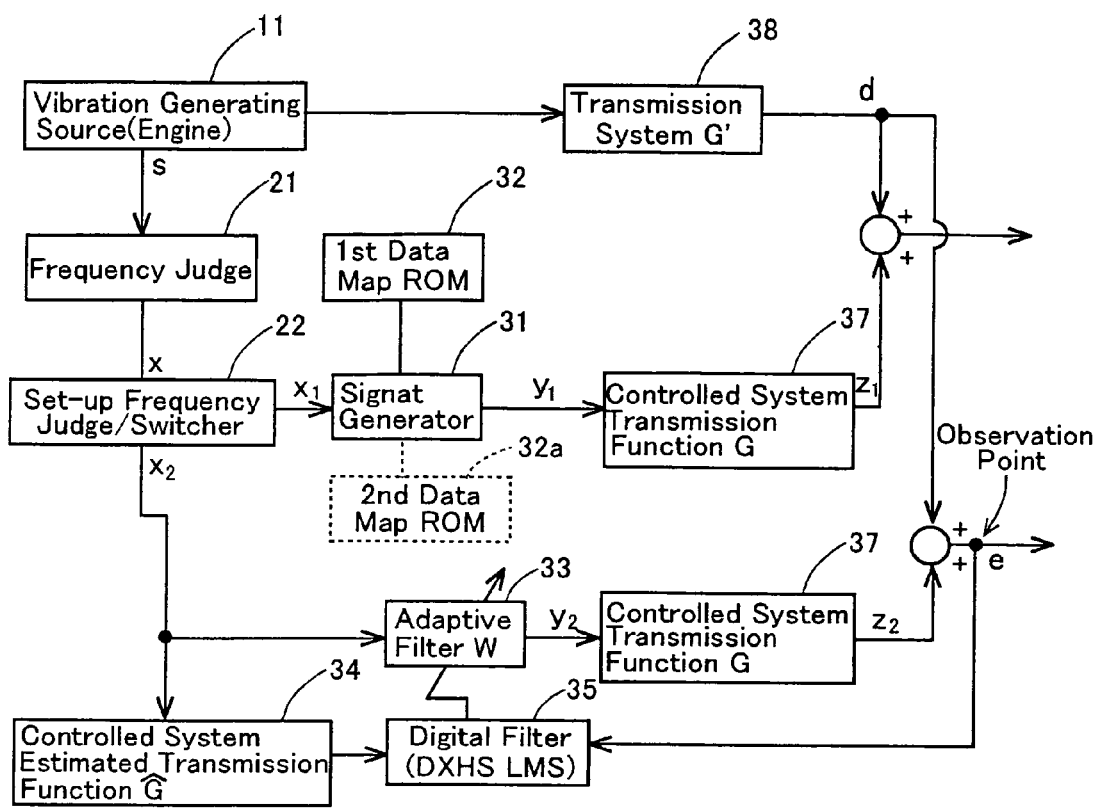
FIG. 2 is a block diagram for roughly illustrating a control mode for removing vibrations by the vibration controller according to Example No. 1 of the present invention.
Figure 3:
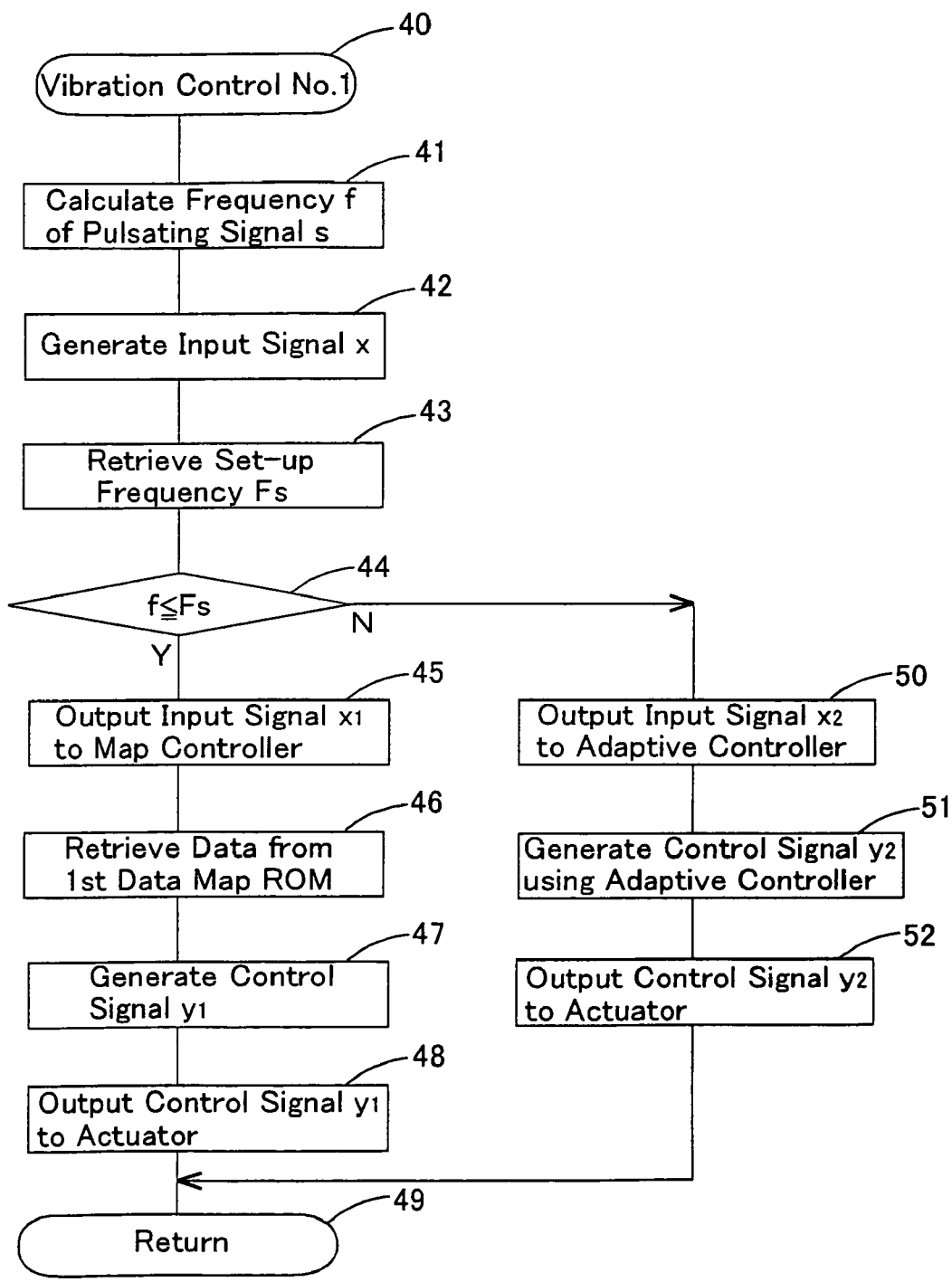
FIG. 3 is a flowchart for "Vibration Control Program No. 1" executed by the vibration controller according to Example No. 1 of the present invention.

FIG. 1 roughly illustrates an arrangement of a vibration controller according to Example No. 1 of the present invention for a 6-cylinder and 4-cycle gasoline-engine-driven vehicle M by means of a schematic diagram. FIG. 2 roughly illustrates a control mode for removing vibrations by the vibration controller by means of a block diagram. FIG. 3 illustrates "Vibration Control Program No. 1" executed by the vibration controller by means of a flowchart.

As illustrated in FIG. 1, the vehicle M comprises a vehicle body 10 which is equipped with an engine mount 15 provided with an actuator, an active vibration insulator, (hereinafter simply referred to as an "engine mount"). The engine mount 15 supports an engine 11, a vibration generating source. The engine mount 15 comprises a cylinder-shaped housing (not shown), a vibration insulator rubber (not shown) disposed in the cylinder-shaped housing, and an electromagnetic actuator 16 disposed in the cylinder-shaped housing. The electromagnetic actuator 16 can be a solenoid, for instance, and controls the dynamic displacements of the engine 11 by the displacements of the vibration insulator rubber. Note that the electromagnetic actuator 15 is not limited to solenoids, but can be pneumatic actuators which generate vibrating forces by switching between different pressures, for example, from the negative-side pressure within an air chamber disposed in an engine mount to the atmosphere-side pressure side thereof, or vice versa. The engine mount 15 is fastened to the vehicle body 10 at the lower fastening shaft (not shown), and is installed to the engine 11 at the upper fastening shaft (not shown), thereby supporting the engine 11. A rotary pulse sensor 12 is disposed adjacent to the crankshaft of the engine 11. The rotary pulse sensor 12 outputs rotary pulsating signals of the crankshaft. A later-described vibration controller unit 20 determines a basic frequency of input signals based on the rotary pulsating signals. Moreover, a load sensor 13 is installed to the engine mount 15 to detect loads applied to the engine mount 15. Note that it is possible to use pressure sensors and acceleration sensors instead of the load sensor 13.

A vibration controller unit 20 of the vibration controller according to Example No. 1 of the present invention electrically controls the engine mount 15 to remove the vibrations of the engine 11. As illustrated in FIG. 1, the vibration controller unit 20 comprises a microcomputer. For example, the microcomputer comprises a frequency judge 21, a set-up frequency judge/switcher 22, a map controller 23, and an adaptive controller 24 using a "DXHS LMS" filter. When the frequency judge 21 receives the cyclically pulsating signals emitted from the engine 11, the frequency judge 21 judges whether the frequency of received pulsating signals is a controlled frequency f or not, selects a controlled signal for the controlled frequency f, and outputs the selected controlled signal as an input signal x. The set-up frequency judge/switcher 22 has a judging function as well as a control switching function. Thus, the set-up frequency judge/switcher 22 judges whether the frequency of the input signal x is a set-up frequency Fs or less and whether the frequency of the input signal x is higher than the set-up frequency Fs. Note that, in Example No. 1, the set-up frequency Fs is set at 50 Hz, a boundary frequency between the first frequency band of the engine 11 under idling and the second frequency band of the engine 11 under running. Moreover, the set-up frequency judge/switcher 22 outputs an input signal x1 to the map controller 23 when the frequency of the input signal x is the set-up frequency Fs or less, and outputs an input signal x2 to the adaptive controller 24 when the frequency of the input signal x is higher than the set-up frequency Fs, thereby switching the vibration control from the adaptive controller 24 to the map controller 23 or vice versa.

In the vibration controller according to Example No. 1 of the present invention, the set-up frequency Fs is calculated by following equation (3). Note that, in the case of the 6-cylinder and 4-cycle gasoline engine, a vibration generating source in Example No. 1, the number of engine cylinders k is 6 pieces; and the crankshaft revolutions Nc, resulting from ignitions in all engine cylinders, are 2 revolutions. Moreover, when the engine revolutions NE per 1 minute is 1,000 rpm at the boundary between the engine 11 under idling and under running, the set-frequency frequency Fs is 50 Hz. In addition, note that the engine revolutions NE and Nc are equivalent to the revolutions of the crankshaft, an engine output shaft.

$$Fs=(NE/60)/(Nc/k) \qquad (3)$$

wherein Fs specifies the set-up frequency (in Hz);

NE specifies engine revolutions per 1 minute (in r/min);

Nc specifies crankshaft revolutions resulting from ignitions in all engine cylinders (in r); and k specifies the number of engine cylinders (in pieces).

As illustrated in FIG. 1, the input side of the vibration control unit 20 is connected with the rotary pulse sensor 12 and load sensor 13. The output side of the map controller 23 and adaptive controller 24 of the vibration control unit 20 is connected with an actuator 26 which converts a control signal y into an actuating signal. The output side of the actuator 26 is connected with the electromagnetic actuator 16 of the engine mount 15. The actuator 26 comprises a pulse-width modulated (hereinafter simply referred to as "PWM") signal generator circuit and an actuator circuit, for instance, thereby converting the control signal y into a sine-wave actuating signal and outputting the resulting sine-wave actuating signal. The PWM signal generator circuit outputs PWM signals modulated by a pulse-width modulation which changes the amplitude of sine waves to the pulse width. The actuator circuit comprises a so-called H-bridge circuit. The sine-wave actuating signal actuates the actuator 16, and thereby the engine mount 15 generates vibrating forces. Thus, the vibration control unit 20 executes "Vibration Control Program No. 1" shown in FIG. 3 cooperatively with the rotary pulse sensor 12, load sensor 13 and actuator 26.

As illustrated in FIG. 2, the map controller 23 receives the input signal x1, and selects a filter coefficient from a first data map ROM 32 at a signal generator 31 depending on the frequency of the input signal x1. Moreover, the map controller 23 synthesizes a sine-wave signal whose amplitude and phase are compensated, and outputs the sine-wave signal to the actuator 26 as a control signal y1. A controlled system 37 (or transmission function G) processes the control signal y1, and outputs a processed signal z1. The processed signal z1 suppresses an external force d, a vibration of the engine 11, which transmits by way of a transmission system 38 (or G'). Note, in Example No. 1, that the data on the filter coefficients for the frequencies of the set-up frequency Fs or less, data which are stored in the 1st data map ROM 32 can be found with ease utilizing the adaptive controller 24. However, not limited to such a method, the data found by the other measurement methods can be stored in the 1st data map ROM 32. Moreover, the data map cannot necessarily comprise a single data map. The data map can comprise a plurality of data maps in which vehicle state signals, such as turning on and off air-conditioners, shift positions and coolant temperatures, are made into optimum filters for the respective states and the resultant optimum filters are made into data maps, respectively. Accordingly, such data maps can be switched one after another to use them for the respective driving states. Consequently, it is possible to carry out the map control more stably.

As illustrated in FIG. 2, the adaptive controller 24 compensates the amplitude and phase of the input signal x2, a controlled signal, with a filter coefficient of an adaptive filter (W) 33, a function of amplitude compensation coefficients and phase compensation coefficients. Moreover, the adaptive controller 24 outputs the compensated input signal x2 as a control signal y2, a sin wave with the compensated amplitude and phase. The controlled system 37 (or transmission function G) processes the control signal y2, and outputs a processed signal z2. The external force d, a vibration of the engine 11, which transmits by way of the transmission system 38 (or G'), is added to the processed signal z2. Then, the load sensor 13 detects the processed signal z2 with the external force d added as an observation value. However, note that the target detection value of the load sensor 13 is zero in vibration control. Accordingly, the difference between the processed signal z2 with the external force d added and the target detection value is an error signal e.

A digital filter 35 updates the adaptive filter (W) 33 sequentially using the error signal e and an estimated value of an estimated transmission function of the controlled system 34. The estimated transmission function of the controlled system 34 can be obtained in advance by impulse response measurements or frequency sweep vibration tests, and is referred to when updating the adaptive controller 33. That is, the control signal y2 is output in the following manner: an optimum filter coefficient is found for every arbitrary revolution (or frequency); the amplitude and phase of the input signal x2, a controlled signal, are compensated by the resulting optimum filter coefficient; and the input signal x2 is synthesized into a sine wave to output the resultant sine wave as the control signal y2. When the thus output control signal y2 is input into the controlled system 37 (or a transmission function G), the controlled system 37 outputs the processed signal z2. The processed signal z2 suppresses the external force d, a vibration of the engine 11, which has transmitted by way of the transmission system 38 (or G').

How the vibration controller according to Example No. 1 of the present invention operates will be hereinafter described.

When starting the engine 11, the vibration control unit 20 starts executing "Vibration Control Program No. 1" shown in FIG. 3 at step 40. At step 41, the rotary pulse sensor 12 detects a crankshaft rotary pulse emitted from the engine 11, and outputs a cyclically pulsating signal s to the vibration control unit 20. When the frequency judge 21 judges that the controlled frequency of the cyclically pulsating signal s is f at step 42, the frequency judge 21 generates a sine-wave input signal x whose frequency is equal to the controlled frequency f. Then, the set-up frequency judge/switcher 22 retrieves a set-up frequency Fs at step 43, and judges whether the controlled frequency f of the input signal x is the retrieved set-up frequency Fs or less or not at step 44. Note that the engine 11 is under idling at present. Accordingly, the controlled frequency f is 50 Hz or less. Consequently, the set-up frequency judge/switcher 22 judges that the controlled frequency f of the input signal x is the retrieved set-up frequency Fs or less at step 44. Thus, the set-up frequency judge/switcher 22 outputs an input signal x1 to the map controller 23 at step 45.

The map controller 23 selects a filter coefficient corresponding to the frequency of the input signal x1 from the first data map ROM 32 at step 46. Moreover, the map controller 23 compensates the amplitude and phase of the input signal x1 using the selected filter coefficient at step 47, and outputs the compensated input signal x1 as a sine-wave control signal y1 to the actuator 26 at step 48. Finally, at step 49, the vibration control unit 20 returns "Vibration Control Program No. 1" to the beginning, step 40. When actuating the electromagnetic actuator 16 by the control signal y1 which is generated by the map controller 23 as a sine-wave actuating signal, it is possible to quickly inhibit the vibrations in the vehicle passenger room in the idling range. Thus, the map controller 23 can quickly inhibit low-frequency range vibrations whose frequency is 50 Hz or less, such as vibrations emitted from vehicles under idling. Therefore, it is possible to solve the problem that passengers perceive low-frequency range vibrations to feel impaired ride quality.

On the other hand, when the vehicle M moves from idling to running to output a cyclically pulsating signal s whose frequency is higher than 50 Hz, the set-up frequency Fs, the set-up frequency judge/switcher 22 judges that the controlled frequency of the input signal x is higher than the set-up frequency Fs at step 44. Moreover, the set-up frequency judge/switcher 22 outputs an input signal x2 to the adaptive controller 24 at step 50. That is, as described above, the set-up frequency judge/switcher 22 compensates the amplitude and phase of the input signal x2 using the filter coefficient selected from the adaptive filter (W) 33, filter coefficient which is updated sequentially by the digital filter 35, at step 51. Moreover, the set-up frequency judge/switcher 22 outputs the input signal x2 with the amplitude and phase compensated as the control signal y2 having an appropriate amplitude and phase at step 52. As a result, in the vehicle M under running, the adaptive controller 24 can generate the control signals y2 which correspond to various driving states of the vehicle M. Thus, the processed signals z2 output from the controlled system 37 inhibit the external forces d resulting from the vibrations of the vehicle M. Therefore, it is possible to carry out an appropriate vibration control for inhibiting vibrations depending on the types of vibrations resulting from the vehicle M under various driving conditions.

As described above, the vibration controller according to Example No. 1 of the present invention distinguishes the frequency of the cyclically pulsating signals s, which are emitted from the vibration generating source 11, based on the set-up frequency Fs, a boundary frequency between the vehicle M under idling and the vehicle M under running. When the frequency of the cyclically pulsating signals s is the set-up frequency Fs or less, the vibration controller lets the map controller 23 carry out the vibration control. When the frequency of the cyclically pulsating signals s is higher than the set-up frequency Fs, the vibration controller lets the adaptive controller 24 carry out the vibration control. Thus, the vibration controller combines the advantage of the map controller 23, the fast response, and the advantage of the adaptive controller 24, allowing an adequate control coping adequately with complicated driving conditions of the vehicle M under running. Therefore, the vibration controller can carry out an adequate vibration control over wide driving conditions of the vehicle M.

EXAMPLE NO. 2

A vibration controller according to Example No. 2 of the present invention will be hereinafter described.

The vibration controller according to Example No. 2 of the present invention copes with the case where the engine 11 is installed to a sub frame (not shown) of the vehicle M. Specifically, the vibration controller copes with the case where a vibration of the sub frame resonates to a vibration of the engine 11 in a high-frequency range of higher than 50 Hz, especially in a high-frequency range of 80 Hz or more, in the range of vehicle under running. In the vibration controller, a data map on control signals for a high-frequency range of 80 Hz or more, which is higher than the set-up frequency Fs and which is a second set-up frequency Fsr or more, for example, 80 Hz or more, the second set-up frequency Fsr being lower than a resonance frequency resonating to the vibration of the sub frame, is found in advance using the adaptive controller 24. Moreover, the resultant data map is stored in a second data map ROM 32a. In addition, the signal generator 31 is further connected with the second data map ROM 32a as shown in FIG. 2.

Moreover, in the vibration controller according to Example No. 2 of the present invention, the set-up frequency judge/switcher 22 has the following extra functions in addition to the above-described function of judging in accordance with the set-up frequency Fs. Specifically, the set-up frequency judge/switcher 22 further has a function of acting as a resonance frequency judging-and-switching means; that is, it has not only a function of judging whether the frequency f of the cyclically pulsating signal s is the second set-up frequency Fsr or more or not but also a function of switching its connection from the adaptive controller 24 to the map controller 23 when the frequency f of the cyclically pulsating signal s is the second set-up frequency Fsr or more. In addition, the program executed by the vibration control unit 20 is changed from "Vibration Control Program No. 1" shown in FIG. 3 to "Vibration Control Program No. 2" shown in FIG. 4. The other constituent elements of the vibration controller are arranged in the same manner as Example No. 1.

How the vibration controller according to Example No. 2 of the present invention operates will be hereinafter described.

Figure 4:
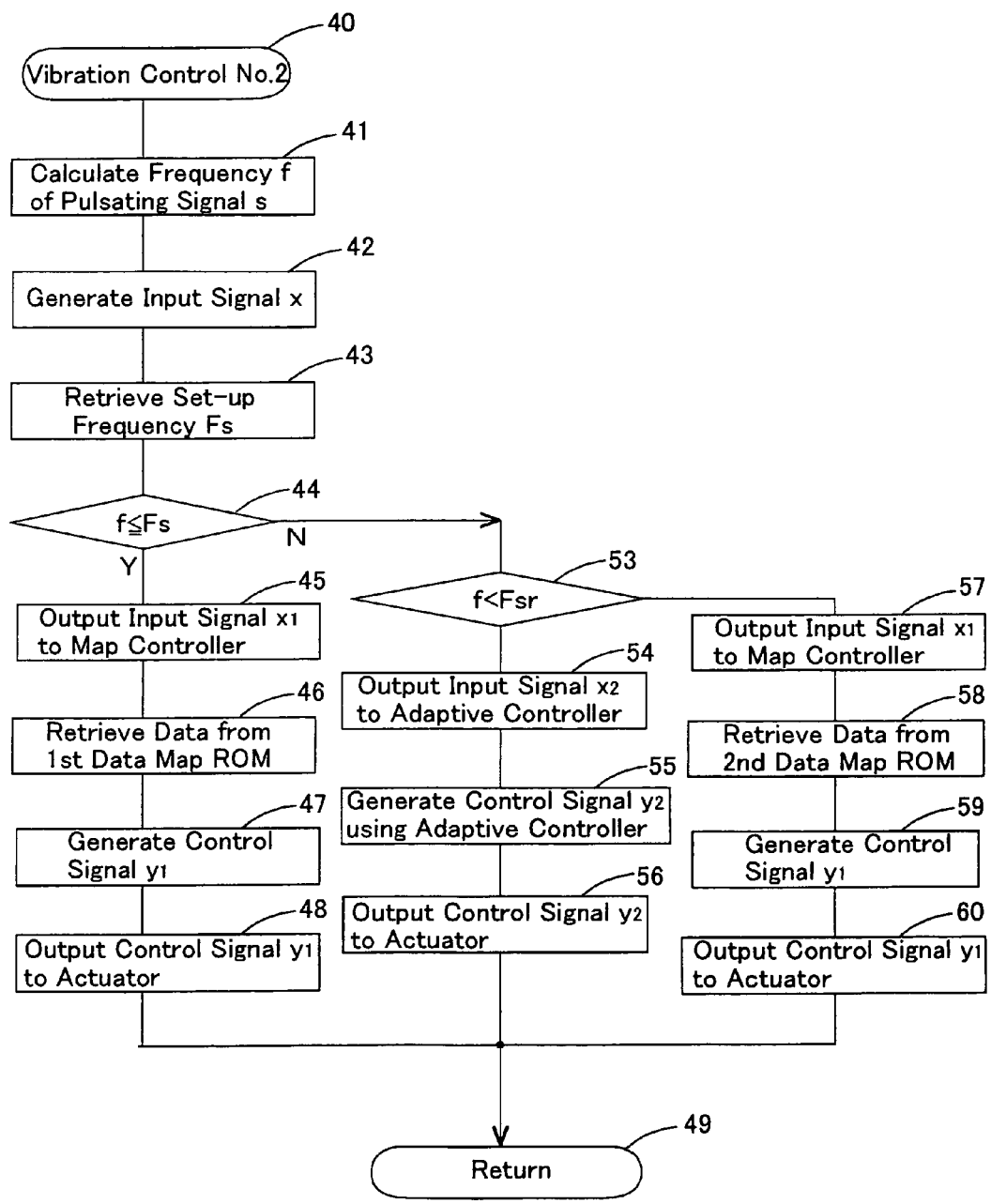
FIG. 4 is a flowchart for "Vibration Control Program No. 2" executed by a vibration controller according to Example No. 2 of the present invention.

When starting the engine 11, the vibration control unit 20 starts executing "Vibration Control Program No. 2" shown in FIG. 4 at step 40. At step 41, the rotary pulse sensor 12 detects a crankshaft rotary pulse emitted from the engine 11, and outputs a cyclically pulsating signal s to the vibration control unit 20. When the frequency judge 21 judges that the controlled frequency of the cyclically pulsating signal s is f at step 42, the frequency judge 21 generates an input signal x whose frequency is equal to the controlled frequency f. Then, the set-up frequency judge/switcher 22 retrieves a set-up frequency Fs at step 43, and judges whether the controlled frequency f of the input signal x is the retrieved set-up frequency Fs or less or not at step 44. In this instance, when the vehicle M is under idling or running, that is, when the controlled frequency f is remarkably lower than the resonance frequency, for instance, 100 Hz, the vibration of the sub frame resonating to the vibration of the engine 11 does not matter. Accordingly, the vibration control unit 20 operates in the same manner as Example No. 1. Consequently, the vibration control unit 20 carries out steps 45 through 48 or steps 54 through 56.

When the vehicle M is under running and when the frequency f of the input signal x is higher than 80 Hz, the second set-up frequency Fsr being slightly lower than the resonance frequency, the set-up frequency judge/switcher 22 judges that the frequency f of the input signal x is the second set-up frequency Fsr or more at steps 44 and 53. Then, at step 57, the set-up frequency judge/switcher 22 switches the outputting end from the adaptive controller 24 to the map controller 23, and outputs an input signal x1 to the map controller 23. The map controller 23 selects a filter coefficient corresponding to the frequency of the input signal x1 from the second data map ROM 32a at step 58. Moreover, the map controller 23 compensates the amplitude and phase of the input signal x1 using the selected filter coefficient at step 59, and outputs the compensated input signal x1 as a sine-wave control signal y1 to the actuator 40 at step 60. Finally, at step 49, the vibration control unit 20 returns "Vibration Control Program No. 2" to the beginning, step 40. Since the electromagnetic actuator 16 is actuated by the control signal y1 which is generated by the map controller 23 as a sine-wave actuating signal, the map controller 23 can quickly inhibit vibrations in the high-frequency range of the second set-up frequency Fsr or more.

As described above, the vibration controller according to Example No. 2 of the present invention copes with the case where the engine 11 is installed to a sub frame of the vehicle M. When the frequency f of the cyclically pulsating signal s, more specifically, the input signal x, is around the resonance frequency, the set-up frequency judge/switcher 22, a resonance frequency judging-and-switching means, judges that the frequency f of the input signal x is the second set-up frequency Fsr being slightly lower than the resonance frequency. Moreover, the set-up frequency judge/switcher 22 switches the outputting end from the adaptive controller 24 to the map controller 23. Then, the map controller 23 selects data corresponding to the frequency of the input signal x1 from the second data map ROM 32a, and generates the control signal y1 based on the selected data. Note that the map controller 23 exhibits a quick response to input signals. Accordingly, the map controller 23 can quickly respond to the resonant vibration to damp it. Consequently, in addition to the advantages produced by the vibration controller according to Example No. 1, the vibration controller according to Example No. 2 can inhibit the control signal y's phase instability resulting from the vibration of the sub frame resonating to the vibration of the engine 11, for instance, the resonant vibration at a high frequency of 80 Hz or more in the vehicle M under running. Thus, the vibration controller according to Example No. 2 can prohibit the occurrence of out-of-control state due to the oscillation of the control signal y.

The vibration controllers according to Example Nos. 1 and 2 of the present invention use the sine wave signals as the input signals. However, not limited to these, it is possible as well to use pulsating signals as the input signals. Moreover, the vibration controllers use the DXHS LMS filter as an adaptive filter. However, it is possible to use the other adaptive filters, such as Filtered-X LMS filters. In addition, Example Nos. 1 and 2 described above are a few examples of the present invention. Therefore, it is possible to carry out the present invention with various changes and modifications as far as they do not deviate from the gist of the present invention.

INDUSTRIAL APPLICABILITY

The present invention switches from a map control method to an adaptive control method or vice versa depending on the frequency range differences of vehicle vibrations, such as the frequency range differences between vehicles under idling and vehicles under running, in order to optimally carry out a vibration control for the respective driving conditions. Accordingly, the present invention combines the advantage of map control method and the advantage of adaptive control method. Consequently, the present invention can carry out an adequate vibration control over wide driving conditions of vehicles. Thus, the present invention is useful industrially. Moreover, the present invention switches from an adaptive control method to a map control method when the frequency of a cyclically pulsating signal is around a resonance frequency. Accordingly, the present invention can quickly damp vibrations resulting from a vibration of sub frames resonating to a vibration of vehicles, especially, to a vibration of engines. Consequently, the present invention can securely prohibit the occurrence of out-of-control state due to the oscillation of control signals. Thus, the present invention is more useful industrially. In addition, the present invention is applicable to the vibration control not only for vehicles or automobiles, but also for the other vibration generating sources, such as industrial machines, machining tools, computer hardware and household electric appliances.

Having now fully described the present invention, it will be apparent to one of ordinary skill in the art that many changes and modifications can be made thereto without departing from the spirit or scope of the present invention as set forth herein including the appended claims.

What is claimed is:

1. A vibration controller for active vibration insulators, the vibration controller comprising:

a map controller including a data map storage for storing data on control signals determined in advance for a vibration insulator disposed on a vehicle, and a signal generator for selecting one of the data from the data map storage and generating a control signal, the one of the data depending on a frequency of a cyclically pulsating signal emitted from a vibration generating source of the vehicle;

an adaptive controller for generating the control signal with respect to the cyclically pulsating signal, the control signal based on an adaptive control method;

set-up frequency judging-and-switching means for switching from the map controller to the adaptive controller or vice versa based on the frequency of the cyclically pulsating signal, whereby letting one of the map controller and the adaptive controller generate the control signal; and means for actuating an actuator of the vibration insulator based on the control signal generated by one of the map controller and the adaptive controller, whereby inhibiting the vehicle from vibrating by means of vibrating forces exerted by the vibration insulator.

2. The vibration controller set forth in claim 1, wherein the set-up frequency judging-and-switching means switches from the adaptive controller to the map controller when the frequency of the cyclically pulsating signal is a predetermined set-up frequency or less, whereby letting the map controller generate the control signal; and switches from the map controller to the adaptive controller when the frequency of the cyclically pulsating signal is higher than the predetermined set-up frequency, whereby letting the adaptive controller generate the control signal.

3. The vibration controller set forth in claim 2, wherein the set-up frequency comprises a boundary frequency between a first frequency band emitted from the vehicle under idling and a second frequency band emitted from the vehicle under running.

4. The vibration controller set forth in claim 2, wherein:
the vibration generating source of the vehicle comprises an engine; and
the set-up frequency is calculated from following equation (1):

$$Fs=(NE/60)/(Nc/k) \qquad (1)$$

wherein Fs specifies the set-up frequency (in Hz);
NE specifies engine revolutions per 1 minute (in r/min) and falls in a range of from 1,000 to 1,5000 rpm;
Nc specifies crankshaft revolutions resulting from ignitions in all engine cylinders (in r); and
k specifies the number of engine cylinders (in pieces).

5. The vibration controller set forth in claim 1, wherein the set-up frequency judging-and-switching means switches from the map controller to the adaptive controller when the frequency of the cyclically pulsating signal is lower than a predetermined set-up frequency, whereby letting the adaptive controller generate the control signal; and switches from the adaptive controller to the map controller when the frequency of the cyclically pulsating signal is the predetermined set-up frequency or more, whereby letting the map controller generate the control signal.

6. The vibration controller set forth in claim 5, wherein:
the vibration generating source is disposed on a sub frame of the vehicle; and
the set-up frequency comprises a frequency being lower than a resonance frequency at which a vibration of the sub frame resonates to a vibration of the vibration generating source.

7. The vibration controller set forth in claim 1, wherein the map controller comprises:
a first map controller including a first data map storage for storing first data on first control signals determined in advance for the vibration insulator, and a first signal generator for selecting one of the first data from the first data map storage and generating a control signal; and
a second map controller including a second data map storage for storing second data on second control signals determined in advance for the vibration insulator, and a second signal generator for selecting one of the second data from the second data map storage and generating a control signal; and
the set-up frequency judging-and-switching means switches from the adaptive controller to the first map controller when the frequency of the cyclically pulsating signal is a first set-up frequency or less, whereby letting the first map controller generate the control signal; switches from the map controller to the adaptive controller when the frequency of the cyclically pulsating signal is higher than the first set-up frequency and is lower than a second set-up frequency, whereby letting the adaptive controller generate the control signal; and switches from the adaptive controller to the second map controller when the frequency of the cyclically pulsating signal is the second set-up frequency or more, whereby letting the second map controller generate the control signal.

8. The vibration controller set forth in claim 7, wherein the first set-up frequency comprises a boundary frequency between a first frequency band emitted from the vehicle under idling and a second frequency band emitted from the vehicle under running.

9. The vibration controller set forth in claim 7, wherein:
the vibration generating source of the vehicle comprises an engine; and
the first set-up frequency is calculated from following equation (2):

$$Fs=(NE/60)/(Nc/k) \qquad (2)$$

wherein Fs specifies the set-up frequency (in Hz);
NE specifies engine revolutions per 1 minute (in r/min) and falls in a range of from 1,000 to 1,5000 rpm;
Nc specifies crankshaft revolutions resulting from ignitions in all engine cylinders (in r); and
k specifies the number of engine cylinders (in pieces).

10. The vibration controller set forth in claim 7, wherein:
the vibration generating source is disposed on a sub frame of the vehicle; and
the second set-up frequency comprises a frequency being lower than a resonance frequency, at which a vibration of the sub frame resonates to a vibration of the vibration generating source, and being higher than the first set-up frequency.

11. A method for controlling vibrations of active vibration insulators, the method comprising the steps of:
generating a map control signal using a data map, which stores data on control signals determined in advance for a vibration insulator disposed on a vehicle, the data depending on a frequency of a cyclically pulsating signal emitted from a vibration generating source of the vehicle, by selecting one of the data from the data map, the one of the data depending on the frequency of the cyclically pulsating signal, thereby generating one of the control signals;

generating an adaptive control signal depending on the frequency of the cyclically pulsating signal, thereby generating one of the control signals with respect to the cyclically pulsating signal, the one of the control signals based on an adaptive control method; and actuating an actuator of the vibration insulator based on the control signal generated by one of the map-control-signal generating step and the adaptive-control-signal generating step depending on the frequency of the cyclically pulsating signal, thereby inhibiting the vehicle from vibrating by means of vibrating forces exerted by the vibration insulator.

12. The vibration control method set forth in claim 11, wherein:

the map-control-signal generating step generates the control signal when the frequency of the cyclically pulsating signal is a predetermined set-up frequency or less; and the adaptive-control-signal generating step generates the control signal when the frequency of the cyclically pulsating signal is higher than the predetermined set-up frequency.

13. The vibration control method set forth in claim 11, wherein:

the map-control-signal generating step generates the control signal when the frequency of the cyclically pulsating signal is a predetermined set-up frequency or more; and the adaptive-control-signal generating step generates the control signal when the frequency of the cyclically pulsating is lower than the predetermined set-up frequency.

14. The vibration control method set forth in claim 11, wherein the data map comprises:

a first data map; and a second data map;

the map-control-signal generating step comprises the steps of:

generating a first data map control signal using the first data map by selecting one of the data from the first data map, the one of the data depending on the frequency of the cyclically pulsating signal, when the frequency of the cyclically pulsating signal is a first set-up frequency or less, thereby generating the control signal; and generating a second data map control signal using the second data map by selecting one of the data from the second data map, the one of the data depending on the frequency of the cyclically pulsating signal, when the frequency of the cyclically pulsating signal is higher than the first set-up frequency and is a second set-up frequency or more, thereby generating the control signal; and the adaptive-control-signal generating step generates the control signal when the frequency of the cyclic pulsating is higher than the first set-up frequency and is lower than the second set-up frequency.

* * * * *